J. STEWART.
BOBBIN FOR THREAD AND THE LIKE.
APPLICATION FILED NOV. 7, 1913.
1,104,325.
Patented July 21, 1914.
2 SHEETS—SHEET 1.
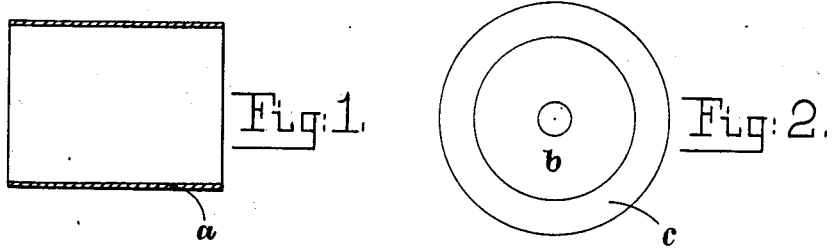
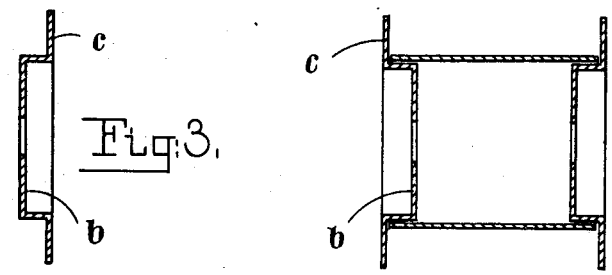
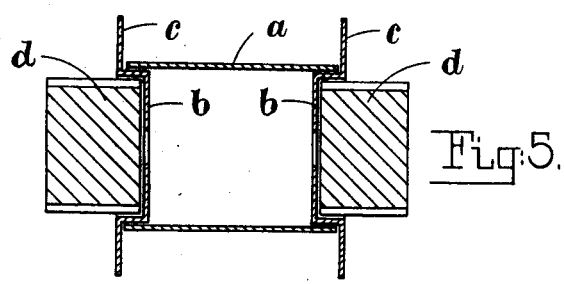
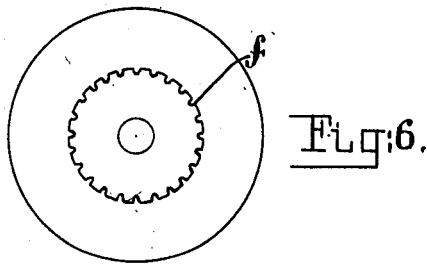
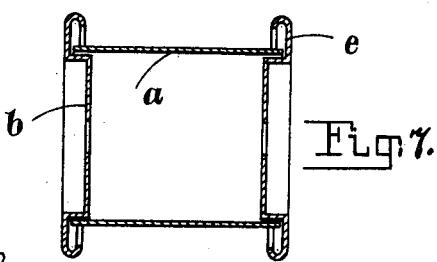

J. STEWART.
BOBBIN FOR THREAD AND THE LIKE.
APPLICATION FILED NOV. 7, 1913.
1,104,325.
Patented July 21, 1914.
2 SHEETS—SHEET 2.
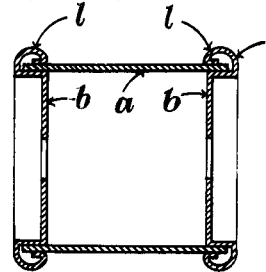
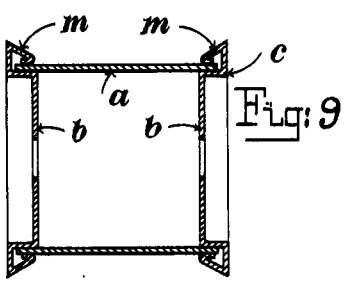
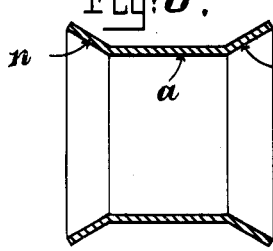
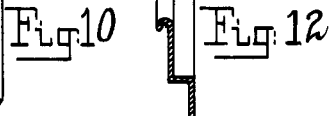
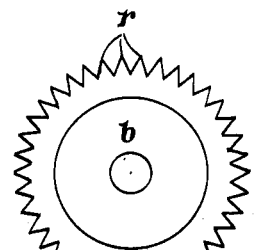
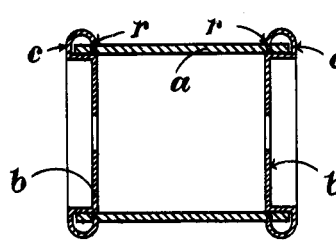
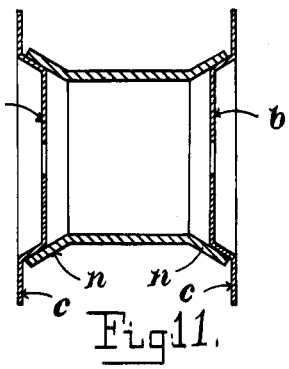
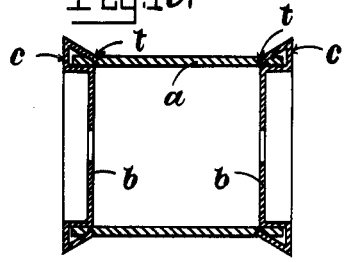
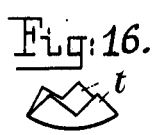
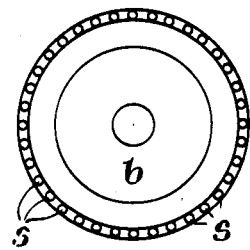
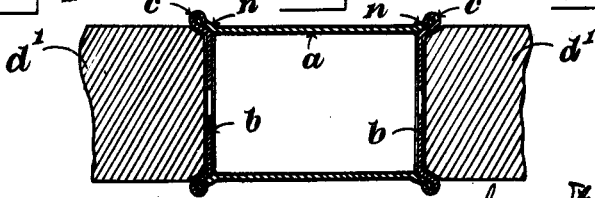

UNITED STATES PATENT OFFICE.

JAMES STEWART, OF CATFORD, ENGLAND.

BOBBIN FOR THREAD AND THE LIKE.

1,104,325.  Specification of Letters Patent.  Patented July 21, 1914.

Application filed November 7, 1913. Serial No. 799,734.

*To all whom it may concern:*

Be it known that I, JAMES STEWART, subject of the King of England, residing at 322 Stanstead road, Catford, England, have invented new and useful Improvements in a Bobbin for Thread and the like, of which the following is a specification.

This invention relates to improvements in bobbins, for thread or the like of the type disclosed in my copending application Serial No. 765765 filed 6th May 1913. These bobbins comprise a tubular or cylindrical body portion made of fibrous material, such as paper, card-board or the like, and end disks having bosses and flanges. The flanges of the disks are turned over on to the body portion in such a manner as to provide flanges for holding the material to be wound on the bobbin. By the term "bobbin" all devices such as reels or spools are intended to be covered. In the known constructions of these bobbins, a disk of strong millboard is first inserted in the ends of the tubular body to serve as a support thereto and a disk of metal or cardboard whereof the edges are serrated is then applied to each end of the tubular body, the serrated edge thereof being turned so that it enters and penetrates the material of the tubular portion.

According to the present invention, instead of employing disks of millboard or the like, the end disks are formed with a central boss portion, which fits into the ends of the tubular body and serves as a support thereto. The peripheral portion of this boss may be roughened, fluted, grooved or have punched up portions for giving greater security to the joint between it and the body portion. The latter is of any known shape, such as a cylindrical or tubular body which may or may not be formed with expanded or conical ends, the boss portion of the end disk being formed in each case of a configuration similar to that of the ends of the body portion.

In order to enable this invention to be readily understood reference is made to the accompanying drawings in which:

Figure 1 is a longitudinal section of a cylindrical body. Fig. 2 is an end elevation, and Fig. 3 a central vertical section of a suitable metal end disk, two of such disks being shown applied to the cylindrical body in Fig. 4 which is a central longitudinal section. Fig. 5 is a central longitudinal section showing the assemblage of parts seen in Fig. 4 supported between two mandrels or spindle ends. Fig. 6 is an end view of an end disk formed with a suitably grooved or roughened boss portion. Fig. 7 shows in longitudinal section the partly turned over peripheries of the end disks after the application of a grooved wheel. Fig. 8 shows the effects produced by a grooved spinning wheel. Fig. 9 shows a modification of Fig. 11. Fig. 10 is a longitudinal section of a body having flared or expanded ends and Fig. 11 shows the application thereto of disks formed with central conical boss portions. Fig. 12 illustrates in vertical section a disk having the edge bounding the central hole upturned for imparting stiffness in any known manner. Fig. 13 is an elevation of an end disk formed with a serrated peripheral portion, and Fig. 14 is a longitudinal section of a finished reel fitted with such end disks. Fig. 15 is an elevation of an end disk having a circular series of punched perforations near its periphery, the punching producing jagged edges on one side of such disk as shown in Fig. 16, which enable the peripheral portion to securely hold on to the end of the body when spun down as shown in Fig. 17. Fig. 18 is a view showing a modification wherein the ends of the tubular body are expanded and the edge portions of the disks turned over simultaneously.

Referring to the drawings *a* represents the body consisting of a tube or cylinder which may be made from several convolutions of a sheet or strip of paper or cardboard, the convolutions being securely glued or pasted together by any method.

*c* are plates or disks stamped out from tinplate, iron or other similar material, the boss portion being suitably pressed out in any desired manner. One of these plates is firmly pressed into each end of the body *a* as shown in Fig. 4. The tubular body with the disks fitted thereto is inserted between two mandrels or shafts *d*, as shown in Fig. 5. To insure that the mandrels shall have a good grip on the disks *b*, the ends of the mandrels may be covered with rubber or other frictional devices or, alternatively, the peripheries of the mandrels may be grooved and if desired grooves $f$, may be made on the peripheries of the bosses of the end plates $c$. The grooves $f$ in the bosses are also of use in preventing the end disks from slipping around inside the tube $a$. To this end the peripheral portions of the bosses may also be roughened, fluted or formed with punched up portions. The flanges of the disk $c$ are then spun over and turned in any manner so that the ends of the body portion are pressed between the bosses and the flanges of the disks $c$, as shown in Figs. 8 and 9, to form tight joints between the disks and the body portion.

When a very deep flange is required, the ends of the paper, cardboard, or other tube $a$ may be expanded or flared as at $n$, Fig. 10, by means of heated dies or revolving cones or by any other known means, before the insertion of the end disks. The boss portions of the disks $c$ have a conical form as shown in Fig. 11, so that they fit the expanded or flared ends $n$. The turning over of the edges is accomplished in any desired manner. While stamping out the disks a lip or curl $o$ may be formed in any known manner around the center hole of each of the disks as shown in Fig. 12, which lip gives the bobbin a firmer and more even grip on the spindle of the winding machine as well as adding stiffness and avoiding a sharp edge. The end disks may also be fastened to the tubular bodies by means of serrations or teeth $r$ cut in the peripheries of the disks as shown in Fig. 13. These teeth when curled over during spinning are forced through the cardboard tube and by turning over against the inner bosses securely fasten the disks $c$ to the tube $a$ Fig. 14.

Instead of the teeth being cut as in Fig. 13 they may be formed around the rim portions of the disks by punching perforations in the metal disks as shown in Fig. 15. Fig. 16 is an enlarged rear view of one of the perforations showing the jagged edges $t$. Fig. 17 shows how these jagged edges are forced into the cardboard tubular body $a$. Should the body $a$ be so thin as to require support during spinning such support may be obtained by placing the tube in a cylindrical case made in halves which are separable in order to allow of the finished bobbin being withdrawn.

The ends of the bodies $a$ may be expanded by the insertion of cone shaped bosses $b$ on the end disks and the edges of the disks turned over and fixed at the same operation thus completing the bobbin in one single operation see Fig. 18. The fixing of the end disks or plates while the ends of the tube are being expanded by the cone shaped bosses of the end disks which in turn are held in position by the tapered ends of the mandrels or shafts $h'$, prevents the expanded ends $n$ of the tube from returning to their original shape when released from the end pressure due to the mandrels. The bobbin shown in Fig. 18 may also be constructed with grooves in the sides of the conical boss portions of the end disks, with upturned edges bounding the central holes in said boss portion, and with serrated edges as to the peripheral portions of the end disks.

Claims:

1. A bobbin comprising a tubular body portion made of fibrous material, metallic end disks having each a central boss portion which fits tightly within each end of said body portion, there being a central opening in said boss portion, flanges on said disks projecting over and turned onto the ends of said body portion, and serrated portions on said flanges where the latter are in contact with the body portion, substantially as described.

2. A bobbin comprising a cylindrical body portion made of fibrous material, conical flared out ends on said body portion, metallic end disks having each a conical boss portion and a central hole in each boss portion, and serrated edges on the peripheral portions of said disks, said peripheral portions projecting over the edges of the body portion and being turned over onto the ends of said body portion, substantially as described.

3. A bobbin comprising a cylindrical body portion made of fibrous material, conical flared out ends on said body portion, metallic end disks having each a conical boss portion, there being a central hole in each boss portion, grooves in the sides of said conical boss portion, an upturned edge bordering each central hole, and serrated edges on the peripheral portions of said disks, said peripheral portions projecting over the edges of the body portion and being turned over onto the ends of said body portion, substantially as described.

4. A bobbin comprising a tubular body portion made of fibrous material, metallic end disks, each having a central boss portion seated within and engaging the ends of said body portion, and flanges on said disks projecting over and turned against the body portion at the ends thereof to compress the body portion between the bosses and the turned portions of the flanges to hold the parts together; substantially as described.

5. A bobbin comprising a tubular body portion made of fibrous material, metallic end disks each having a central boss portion, an external friction surface on the sides of said boss portions in direct contact with the inner face of the body portion, and flanges on said end disks projecting over and turned against said body portion at the ends thereof to compress said body portion between the bosses and the turned portions of the flanges to hold the parts together; substantially as described.

In testimony whereof I have signed my name to this specification in the presence of two subscribing witnesses.

JAMES STEWART.

Witnesses:
  HOWARD C. ELLIOTT,
  W. E. ROGERS.